(12) United States Patent
Wang et al.

(10) Patent No.: US 11,120,254 B2
(45) Date of Patent: Sep. 14, 2021

(54) METHODS AND APPARATUSES FOR DETERMINING HAND THREE-DIMENSIONAL DATA

(71) Applicant: BEIJING SENSETIME TECHNOLOGY DEVELOPMENT CO., LTD., Beijing (CN)

(72) Inventors: Quan Wang, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 87 days.

(21) Appl. No.: 16/451,077

(22) Filed: Jun. 25, 2019

(65) Prior Publication Data
US 2019/0311190 A1 Oct. 10, 2019

Related U.S. Application Data

(63) Continuation of application No. PCT/CN2018/080960, filed on Mar. 28, 2018.

(30) Foreign Application Priority Data

Mar. 29, 2017 (CN) .......................... 201710198505.7

(51) Int. Cl.
*G06K 9/00* (2006.01)
*G06T 7/11* (2017.01)
(Continued)

(52) U.S. Cl.
CPC ..... *G06K 9/00355* (2013.01); *G06K 9/00362* (2013.01); *G06K 9/00389* (2013.01);
(Continued)

(58) Field of Classification Search
CPC .......... G06K 9/00355; G06K 9/00362; G06K 9/00389; G06K 9/4604;
(Continued)

(56) References Cited

U.S. PATENT DOCUMENTS 6,198,485 B1 * 3/2001 Mack ...................... G06F 3/013
345/419
6,417,969 B1 * 7/2002 DeLuca ................... G06F 3/011
359/630
(Continued)

FOREIGN PATENT DOCUMENTS

CN 102799318 A 11/2012
CN 102831407 A 12/2012
(Continued)

OTHER PUBLICATIONS

Hu Hong, Chao Jiangang, etc., Key Point Model for Hand Pose Estimation Based on Leap Motion, Journal of Computer-Aided Design & Computer Graphics, vol. 27, No. 7, Jul. 31, 2015 (Jul. 31, 2015), 1211-1216.
(Continued)

*Primary Examiner* — Aaron W Carter
(74) *Attorney, Agent, or Firm* — Syncoda LLC; Feng Ma

(57) ABSTRACT

A method for determining hand three-dimensional data includes: obtaining a first hand image and a second hand image captured by a binocular photographing system; identifying, from each of the first hand image and the second hand image, at least one key point and a region profile covering the at least one key point; determining depth information of the at least one key point and depth information of the region profile according to a photographing parameter of the binocular photographing system, the at least one key point and the region profile identified from the first hand image, and the at least one key point and the region profile identified from the second hand image; and deter-
(Continued)

mining hand three-dimensional data according to the at least one key point and the depth information of the at least one key point together with the region profile and the depth information of the region profile.

20 Claims, 4 Drawing Sheets

(51) Int. Cl.
  *G06T 7/13* (2017.01)
  *G06K 9/46* (2006.01)
  *G06F 3/01* (2006.01)
(52) U.S. Cl.
  CPC .............. *G06K 9/4604* (2013.01); *G06T 7/11* (2017.01); *G06T 7/13* (2017.01); *G06F 3/017* (2013.01); *G06K 2009/00395* (2013.01); *G06T 2207/10012* (2013.01); *G06T 2207/10028* (2013.01); *G06T 2207/30196* (2013.01)
(58) Field of Classification Search
  CPC ..... G06K 2009/00395; G06K 9/00214; G06K 9/6202; G06T 7/11; G06T 7/13; G06T 2207/30196; G06T 2207/10012; G06T 2207/10028; G06F 3/017
  See application file for complete search history.

(56) References Cited

U.S. PATENT DOCUMENTS

| | | | | |
|---|---|---|---|---|
| 7,660,458 | B1* | 2/2010 | Saric | G06T 7/593 |
| | | | | 382/154 |
| 8,745,541 | B2 | 6/2014 | Wilson | |
| 8,971,572 | B1* | 3/2015 | Yin | G06K 9/00624 |
| | | | | 382/103 |
| 9,870,056 | B1* | 1/2018 | Yao | H04N 9/3185 |
| 10,078,796 | B2* | 9/2018 | Lim | G06K 9/00389 |
| 2004/0193413 | A1 | 9/2004 | Wilson | |
| 2008/0002860 | A1* | 1/2008 | Super | G06K 9/00899 |
| | | | | 382/114 |
| 2009/0110292 | A1* | 4/2009 | Fujimura | G06F 3/017 |
| | | | | 382/203 |
| 2010/0138798 | A1 | 6/2010 | Wilson | |
| 2010/0151946 | A1 | 6/2010 | Wilson | |
| 2010/0329511 | A1* | 12/2010 | Yoon | G06K 9/00382 |
| | | | | 382/103 |
| 2011/0102570 | A1* | 5/2011 | Wilf | G06F 3/017 |
| | | | | 348/77 |
| 2012/0195493 | A1* | 8/2012 | Lin | G06T 7/97 |
| | | | | 382/154 |
| 2013/0190089 | A1 | 7/2013 | Wilson | |
| 2013/0265220 | A1* | 10/2013 | Fleischmann | G06F 3/011 |
| | | | | 345/156 |
| 2013/0271370 | A1* | 10/2013 | Wang | G06K 9/00389 |
| | | | | 345/158 |
| 2013/0324248 | A1 | 12/2013 | Wilson | |
| 2013/0342671 | A1* | 12/2013 | Hummel | G06F 3/011 |
| | | | | 348/77 |
| 2014/0176676 | A1* | 6/2014 | Lin | H04N 13/366 |
| | | | | 348/46 |
| 2014/0232696 | A1* | 8/2014 | Kuboyama | G06F 3/0425 |
| | | | | 345/175 |
| 2014/0292723 | A1* | 10/2014 | Suzuki | G06F 3/04883 |
| | | | | 345/175 |
| 2016/0048230 | A1* | 2/2016 | Shimoda | G06T 19/006 |
| | | | | 345/633 |
| 2016/0116995 | A1 | 4/2016 | Wilson et al. | |
| 2016/0320863 | A1* | 11/2016 | Shimoda | G06F 3/0304 |
| 2017/0086712 | A1* | 3/2017 | Mauro | A61B 5/1101 |
| 2017/0097687 | A1* | 4/2017 | Pinault | G06F 3/017 |
| 2018/0004355 | A1* | 1/2018 | Shahar | G06T 7/593 |
| 2018/0025540 | A1* | 1/2018 | Ma | G06T 17/20 |
| | | | | 345/419 |
| 2018/0189975 | A1* | 7/2018 | Inada | G01C 3/085 |
| 2018/0336733 | A1* | 11/2018 | Koga | G06T 19/006 |
| 2019/0243462 | A1* | 8/2019 | Li | G06F 3/0304 |
| 2019/0279391 | A1* | 9/2019 | Narikawa | G06T 7/70 |
| 2019/0311190 | A1* | 10/2019 | Wang | G06T 7/11 |
| 2019/0354746 | A1* | 11/2019 | Zhang | G06K 9/00906 |
| 2020/0128180 | A1* | 4/2020 | Chen | G01B 11/2527 |
| 2020/0160548 | A1* | 5/2020 | Yun, II | H04N 13/10 |
| 2020/0326783 | A1* | 10/2020 | Kwon | G06F 3/011 |

FOREIGN PATENT DOCUMENTS

| | | |
|---|---|---|
| CN | 102902355 A | 1/2013 |
| CN | 102981623 A | 3/2013 |
| CN | 102902355 B | 12/2015 |

OTHER PUBLICATIONS

Third Office Action of the Chinese application No. 201710198505.7, dated Aug. 31, 2020.
International Search Report in the international application No. PCT/CN2018/080960, dated Jun. 7, 2018.
English translation of the Written Opinion of the International Search Authority in the international application No. PCT/CN2018/080960, dated Jun. 7, 2018.
Lowe D G. Distinctive image features from scale-invariant keypoints[J]. International journal of computer vision, 2004, 60(2): 91-110.
Oikonomidis I, Kyriazis N, Argyros A A. Tracking the articulated motion of two strongly interacting hands[C]//Computer Vision and Pattern Recognition (CVPR), 2012 IEEE Conference on. IEEE, 2012: 1862-1869.
Wu Y, Lin J Y, Huang T S. Capturing natural hand articulation[C]//Computer Vision, 2001. ICCV 2001. Proceedings. Eighth IEEE International Conference on. IEEE, 2001, 2: 426-432.
Rehg J M, Kanade T. Visual tracking of high dof articulated structures: an application to human hand tracking[M]//Computer Vision—ECCV'94. Springer Berlin Heidelberg, 1994: 35-46.
Melax S, Keselman L, Orsten S. Dynamics based 3D skeletal hand tracking[C]//Proceedings of Graphics Interface 2013. Canadian Information Processing Society, 2013: 63-70.

* cited by examiner

METHODS AND APPARATUSES FOR DETERMINING HAND THREE-DIMENSIONAL DATA

CROSS-REFERENCE TO RELATED APPLICATIONS

The present application is a continuation application of International Application No. PCT/CN2018/080960 filed on Mar. 28, 2018, which claims priority to Chinese Patent Application No. 201710198505.7 filed on Mar. 29, 2017. The disclosures of these applications are hereby incorporated by reference in their entirety.

BACKGROUND

Hand data is important input data in a human-computer interaction field; capturing a change in human hand data can implement using a gesture action to control a smart device.

SUMMARY

The present disclosure relates to computer vision technologies, and in particular, to methods and apparatuses for determining hand three-dimensional data. Embodiments of the present disclosure provide a technical solution for determining hand three-dimensional data.

A method for determining hand three-dimensional data provided according to one aspect of the embodiments of the present disclosure includes: obtaining a first hand image and a second hand image captured by a binocular photographing system; identifying, from each of the first hand image and the second hand image, at least one key point and a region profile covering the at least one key point; determining depth information of the at least one key point and depth information of the region profile according to a photographing parameter of the binocular photographing system, the at least one key point and the region profile identified from the first hand image, and the at least one key point and the region profile identified from the second hand image;

and determining hand three-dimensional data according to the at least one key point and the depth information of the at least one key point together with the region profile and the depth information of the region profile.

An apparatus for determining hand three-dimensional data provided according to another aspect of the embodiments of the present disclosure includes: a memory storing processor-executable instructions; and a processor arranged to execute the stored processor-executable instructions to perform steps of: obtaining a first hand image and a second hand image captured by a binocular photographing system; identifying, from each of the first hand image and the second hand image, at least one key point and a region profile covering the at least one key point; determining depth information of the at least one key point and depth information of the region profile according to a photographing parameter of the binocular photographing system, the at least one key point and the region profile identified from the first hand image, and the at least one key point and the region profile identified from the second hand image; and determining the hand three-dimensional data according to the at least one key point and the depth information of the at least one key point together with the region profile and the depth information of the region profile.

An apparatus for determining hand three-dimensional data provided according to another aspect of the embodiments of the present disclosure includes: an obtaining unit, configured to obtain a first hand image and a second hand image captured by a binocular photographing system; an identifying unit, configured to identify, from each of the first hand image and the second hand image, at least one key point and a region profile covering the at least one key point; a depth determining unit, configured to determine depth information of the at least one key point and depth information of the region profile according to a photographing parameter of the binocular photographing system, the at least one key point and the region profile identified from the first hand image, and the at least one key point and the region profile identified from the second hand image; and a three-dimensional data determining unit, configured to determine hand three-dimensional data according to the at least one key point and the depth information of the at least one key point together with the region profile and the depth information of the region profile.

An electronic device provided according to another aspect of the embodiments of the present disclosure includes: at least one processor; and a memory communicationally connected to the at least one processor; where the memory stores instructions executable by the at least one processor; and the instructions are executed by the at least one processor, so that the at least one processor executes operations corresponding to the method for determining hand three-dimensional data according to any one of the embodiments of the present disclosure.

A non-transitory computer-readable storage medium provided by a further aspect of the embodiments of the present disclosure has stored thereon computer instructions that, when executed by a processor, cause the processor to perform a method for determining hand three-dimensional data, the method including: obtaining a first hand image and a second hand image captured by a binocular photographing system; identifying, from each of the first hand image and the second hand image, at least one key point and a region profile covering the at least one key point; determining depth information of the at least one key point and depth information of the region profile according to a photographing parameter of the binocular photographing system, the at least one key point and the region profile identified from the first hand image and the at least one key point and the region profile identified from the second hand image; and determining the hand three-dimensional data according to the at least one key point and the depth information of the at least one key point together with the region profile and the depth information of the region profile.

According to yet another aspect of the embodiments of the present disclosure, provided is a computer program, including a computer-readable code, where when the computer-readable code runs in a device, a processor in the device executes instructions for implementing steps of the three-dimensional data determining method according to any one of the embodiments of the present disclosure.

The following further describes in detail the technical solutions of the present disclosure with reference to the accompanying drawings and embodiments.

BRIEF DESCRIPTION OF THE DRAWINGS

To describe the technical solutions in embodiments of the present disclosure or the prior art more clearly, the accompanying drawings required for describing the embodiments of the present disclosure or the prior art are briefly introduced below. Apparently, the accompanying drawings in the following description show merely some embodiments of the present disclosure, and a person of ordinary skill in the art can still derive other accompanying drawings from these accompanying drawings without creative efforts.

DETAILED DESCRIPTION

Figure 1:
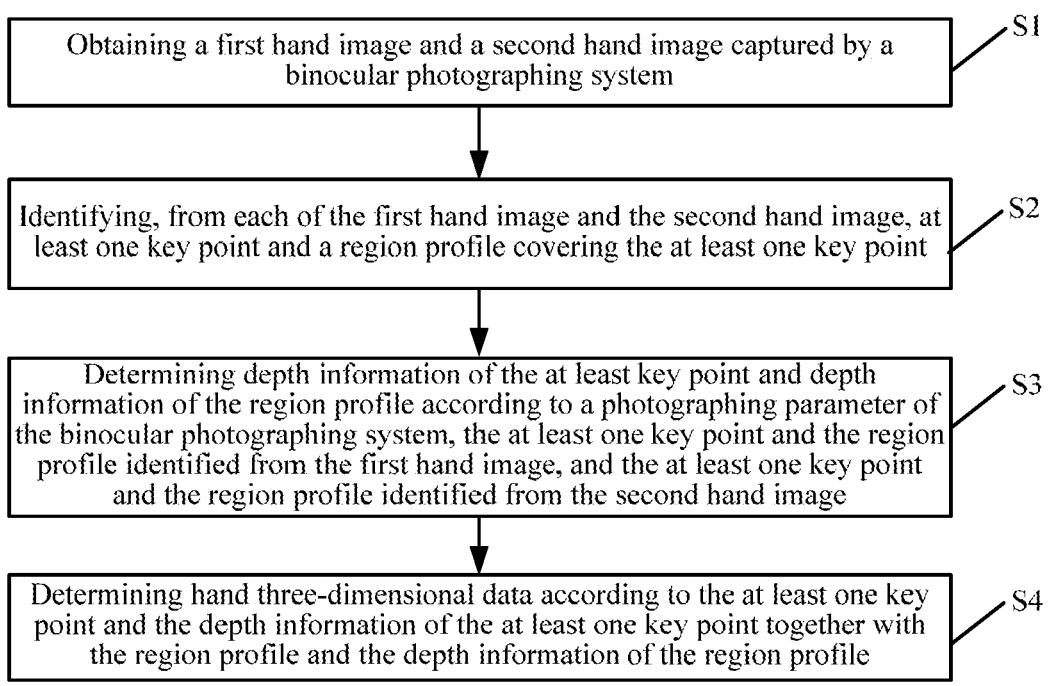
FIG. 1 is a flow chart of a method for determining hand three-dimensional data according to embodiments of the present disclosure.

The technical solutions of the embodiments of the present disclosure are described clearly and integrally by combining the drawing; obviously, the described embodiments are some of the embodiments of the present disclosure rather than all the embodiments. Based on the embodiments of the present disclosure, all other embodiments obtained by a person of ordinary skill in the art without involving an inventive effort shall fall within the scope of protection of the present disclosure.

It should be illustrated that in the description of the present disclosure, the terms such as "first" and "second" are only used for the purpose of describing, and cannot be understood as indicating or implying relative importance. In addition, technical features involved in different embodiments of the present disclosure described below can be combined with one another as long as they do not conflict with one another. As used herein, the term "and/or" includes any and all combinations of one or more of the associated listed items.

It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

Embodiments of the present disclosure provide a method for determining hand three-dimensional data. FIG. 1 is a flow chart of a method for determining hand three-dimensional data according to embodiments of the present disclosure. As shown in FIG. 1, the method for determining hand three-dimensional data according to embodiments includes the following steps:

S1, a first hand image and a second hand image are captured by a binocular photographing system.

The binocular photographing system has two imaging devices; based on a parallax principle, the two imaging devices are used to obtain two images of an object to be measured from different positions; the obtained two images of a hand are referred to as a first hand image and a second hand image. Multiple types of the binocular photographing system exist; using any type of the binocular photographing system to photograph the hand so as to obtain two hand images is feasible.

In an optional example, step S1 may be performed by a processor by invoking a corresponding instruction stored in a memory, and may also be performed by an obtaining unit run by the processor.

S2, at least one key point and a region profile covering the at least one key point are separately identified from the first hand image and the second hand image.

The key point therein may include, but not limited to, for example, any one or more of: a fingertip, a finger joint point, or a palm center. The region profile covering the corresponding key point may include, but not limited to, for example, any one or more of: a finger region profile covering a fingertip and/or a finger joint point, or a palm region profile covering a palm center. For example, the key points are five fingertips and one palm center; the region profiles are finger region profiles covering respective fingertips and a palm region profile covering the palm center. The two hand images may be two-dimensional images; many modes for identifying a target meeting a predetermined feature from a two-dimensional image exist, and using each mode is feasible.

In an optional example, step S2 may be performed by a processor by invoking a corresponding instruction stored in a memory, and may also be performed by an identifying unit run by the processor.

S3, depth information of at least one key point and depth information of the corresponding region profile are determined according to a photographing parameter of the binocular photographing system, the at least one key point and the corresponding region profile identified from the first hand image, and the at least one key point and the corresponding region profile identified from the second hand image.

The two cameras of the binocular photographing system photograph one object to obtain two images; to determine depth information of the object in the images, object points in the two images can be matched, i.e., image matching. The image matching refers to corresponding one point or one region profile in a three-dimensional space to an image point or region profile on two imaging faces of left and right cameras. After the object points matching one another are found, the depth of the object points can be determined according to the photographing parameter.

For the key points, first taking the key point to be the palm center as an example, upon identification processing, palm centers aL and aR can be separately identified from the two images; since only one palm center exists in each of the two images, aL can be corresponded to aR directly; similarly, the palm region profiles can also be directly corresponded. For the matching of the region profiles, each of the region profile consists of multiple points; in this step, only edge points on the region profiles can be processed.

For the determining of the depth information, in one embodiment, a central point of a binocular connecting line of the binocular photographing system can be used as an origin to establish a coordinate system, where a plane parallel to an imaging plane of the binocular photographing system is an XY plane, a direction vertical to the plane is a Z direction, the Z direction is the depth direction, and a depth value of the key point is a Z coordinate value in the coordinate system. After the matching result is determined, based on projection points of the same object point on the left and right cameras and by means of the parameter of the binocular camera, wide angle distortion of the camera can be recovered; by further using parameters such as camera focal lengths and an interval between the left and right cameras and according to a geometric imaging relation of the cameras, the depth information of the object point can be obtained by means of calculation.

In an optional example, step S3 may be performed by a processor by invoking a corresponding instruction stored in a memory, and may also be performed by a depth determining unit run by the processor.

S4, hand three-dimensional data is determined according to the at least one key point and the depth information of the at least one key point together with the corresponding region profile and the depth information of the corresponding region profile.

The hand three-dimensional data above may include, but not limited to, for example any one or more of: three-dimensional data of the key point, edge three-dimensional point cloud data of the region profile, hand direction data, or gesture information.

In an optional example, step S4 may be performed by a processor by invoking a corresponding instruction stored in a memory, and may also be performed by a three-dimensional data determining unit run by the processor.

The method for determining hand three-dimensional data provided in the embodiments of the present disclosure includes identifying, in the first hand image and the second hand image captured by the binocular photographing system, the key point and region profile; then according to characteristics of a human hand, implementing matching of the key point and region profile, and determining the depth of the key point and the depth of the region profile; and finally, according to the matching result of the key point and the depth of the key point, the matching result of the edge points on the region profile, and the projected depth of the edge points on the region profile, determining the hand three-dimensional data. According to the technical solution provided by the present disclosure, regarding contents such as object points and region profiles that can be identified in a two-dimensional image, the depth thereof can all be determined by mutual matching, and three-dimensional data thereof can further be determined. Hence, determining a large amount of hand three-dimensional information based on a single frame of a two-dimensional image can be implemented; moreover, the determined hand three-dimensional data is more accurate and richer, generation of unreasonable hand three-dimensional data is avoided, and high efficiency and accuracy are included.

Figure 2:
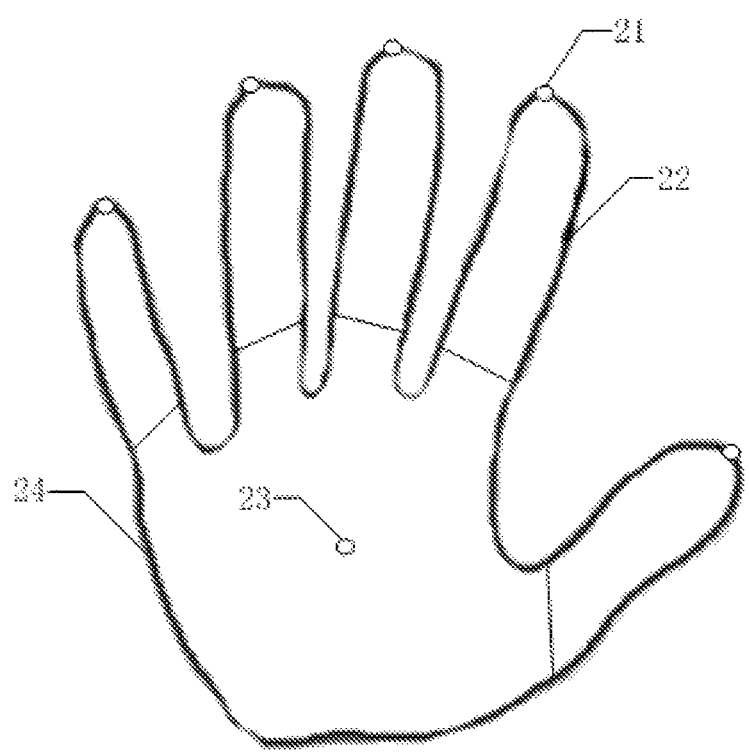
FIG. 2 is a schematic diagram of a hand key point and a region profile according to the embodiments of the present disclosure.

FIG. 2 is a schematic diagram of a hand key point and a region profile according to the embodiments of the present disclosure. As shown in FIG. 2, for the condition that only a palm center 23 and a hand region profile 24 covering the palm center 23 are required to be identified, step S2 above can be implemented by multiple means, for example, in an optional means, the following steps may be included:

S21a, a palm center 23 is separately identified in the first hand image and the second hand image.

In an embodiment, the palm center 23 can be identified according to line features and region features in the image.

To reduce influences of an illumination condition on the image, an infrared camera can be selected to directly obtain a gray scale image; then binarization processing is performed on the image; pixel points greater than a certain threshold are all assigned with a value of 255, and the remaining pixel points are assigned with a value of 0, so as to obtain a bar chart.

In an optional example, step S21a may include the following steps:

S21a1, a maximum communication region profile is separately determined in the first hand image and the second hand image upon binarization processing, i.e., finding a maximum communication set consisting of points assigned with the value 255, and assigning all of the remaining points the value of 0, where the maximum communication set is considered as a projection region profile of the hand in the image;

S21a2, the position of the palm center 23 is separately determined according to the maximum communication region profile in the first hand image and the second hand image.

According to one or more embodiments of the present disclosure, Manhattan distance transformation can be performed on the maximum communication region profile from edges of two maximum communication region profiles separately, i.e., starting from edge points for a Breadth-First Search (BFS), and recording layer-by-layer a minimum Manhattan distance from each point to the edge points, to obtain the Manhattan distance from each point in the region profile to the edge. Then the farthest point away from the edge is preliminarily determined as the palm center 23.

In an optional example, step S21a may be performed by a processor by invoking a corresponding instruction stored in a memory, and may also be performed by a palm center identifying unit run by the processor.

S22a, a palm region profile 24 covering the palm center is separately determined in the first hand image and the second hand image according to the position of the identified palm center 23.

Under the condition that the palm center 23 is determined, there are multiple means for determining a region covering the palm center 23. In an optional example, the following steps can be included:

S22a1, a palm radius is separately determined according to a distance from the position of the palm center 23 to each of edges of two maximum communication regions.

According to one or more embodiments of the present disclosure, the closest point away from the palm center 23 in the edge points of the maximum communication region can be found, and a Euclidean distance between the closest point and the palm center 23 is preliminarily determined as a palm radius.

S22a2, the palm region profile 24 is separately determined according to the palm radius.

For example, a region profile consisting of points with the Euclidean distance from the palm center 23 less than 1.5 times of the radius in the hand region profile can be marked as the palm region profile 24.

In the embodiments, the maximum communication region is searched for from the hand images upon binarization processing, so as to determine the palm center 23 and the palm region profile 24 based on the maximum communication region. This solution relates to searching for the maximum communication region by means of line features, and then determining the palm based on the maximum region, and may reduce influences of image colors and gray scales. Therefore, processing efficiency can be improved.

In an optional example, step S22a may be performed by a processor by invoking a corresponding instruction stored in a memory, and may also be performed by a palm identifying unit run by the processor.

As shown in FIG. 2, for the condition that a fingertip 21 and a finger region profile 22 covering the fingertip 21 are required to be identified, step S2 above may include the following steps:

S21b, a palm center 23 is separately identified in the first hand image and the second hand image.

That is, before identifying the fingertip 21 and the finger region profile 22, the palm center 23 is first determined, and then based on the palm center 23, the fingertip 21 and the finger region profile 22 are determined. This step may be the same as step S21a above, and therefore is omitted herein.

In an optional example, step S21b may be performed by a processor by invoking a corresponding instruction stored in a memory, and may also be performed by a palm center identifying unit run by the processor.

S22b, at least one fingertip 21 and/or at least one finger joint point position are separately determined in the first hand image and the second hand image according to the position of the identified palm center 23.

As stated above, during the process of determining the palm center 23, the maximum communication region is determined separately in the two images. Hence, the fingertip 21 and the finger region profile 22 can further be searched for based on the maximum communication region. In an optional example, step S22b may include the following steps:

S22b1, a point, in the maximum communication region, farthest from the palm center 23 position is determined.

S22b2, a suspected finger region profile in the maximum communication region is determined based on the point farthest from the palm center 23 position.

For example, the point farthest from the palm center 23 position can be found in the maximum communication region; starting from the farthest point, breadth-first extension is performed in the maximum communication region profile, to obtain the suspected finger region profile.

S22b3, a fingertip 21 from the point farthest from the palm center 23 position is determined and a position thereof is obtained according to the shape of the suspected finger region profile.

In an optional example, step S22b may be performed by a processor by invoking a corresponding instruction stored in a memory, and may also be performed by a fingertip identifying unit run by the processor.

S23b, a finger region profile 22 covering the fingertip 21 and/or finger joint point are separately determined according to the fingertip 21 and/or finger joint point position in the first hand image and the second hand image.

Operation processes of steps S22b3 and S23b are: based on shape features, determining whether the shapes of the suspected finger region profiles are fingers; if the shapes of the suspected finger region profiles are fingers, preliminarily determining the correspondingly farthest points (a starting point) as fingertips, and deciding the suspected finger region profiles as the finger region profiles 22; if the shapes of the suspected finger region profiles are not fingers, removing the suspected finger region profiles, and continuously determining the remaining suspected finger region profiles (repeating the step for multiple times), until decision of all the suspected finger region profiles are completed, and all finger region profiles 22 and corresponding fingertips 21 are found; and then obtaining positions thereof. In the embodiments, the palm center is determined in the hand image upon binarization processing, so as to determine the point in the points on the edge of the maximum communication region farthest away from the palm center; then the region profiles of the suspected fingers are searched for based on the starting point; non-finger region profiles are further excluded according to the profile shapes in the found suspected finger region profiles to screen the finger region profiles. Hence, influences of other regions such as a wrist on the identification process can be excluded, and after finding the finger region profiles, the corresponding starting points are determined as the fingertips. Hence, accuracy and processing efficiency can be improved.

In an optional example, step S23b may be performed by a processor by invoking a corresponding instruction stored in a memory, and may also be performed by a finger identifying unit run by the processor.

As another optional embodiment, after step S23b above, the following steps may further be included:

S24b, the fingertip 21 position is separately corrected and a finger root position is determined according to each finger region profile 22 in the first hand image and the second hand image.

Since the previously determined fingertip 21 position is separately determined according to the content of the two images, after determining the corresponding finger region profile 22 in each of the two images, the previous fingertip 21 position can be corrected, i.e., re-determining the fingertip 21 position, and the corrected fingertip 21 position is more accurate than the previously determined fingertip 21 position. The finger root position is a position where the finger is connected to the palm. Under the condition that the fingertip 21 position and the palm 23 position are known, there are multiple means for determining each finger root position. Step S24b According to one or more embodiments of the present disclosure includes the following steps:

S24b1, main component analysis processing is separately performed on edge points on the at least one finger region profile 22, and an obtained main direction is used as a finger direction.

The main component analysis is a multivariate statistics method, including performing statistics and analysis on two-dimensional points to obtain two vectors to respectively correspond to two feature values. The greater the corresponding feature values are, the more significant the distribution of point cloud along this direction is; the main direction is the vector having the maximum corresponding feature value.

S24b2, a maximum projection point in the at least one finger direction is separately determined as a corrected fingertip 21 position.

S24b3, a minimum projection point in the at least one finger direction is separately determined as a finger root position.

In an optional example, step S24b may be performed by a processor by invoking a corresponding instruction stored in a memory, and may also be performed by a fingertip correcting unit run by the processor.

S25b, a relative distribution of each finger region profile 22 is determined according to the corrected fingertip 21 position and the finger root position.

That is, the thumb, index finger, middle finger, ring finger, and little finger are identified. According to one or more embodiments of the present disclosure, for each finger, a straight line can be determined according to two points, i.e., the fingertip 21 and the finger root; five fingers correspond to five straight lines; the five straight lines have an angle with respect to one another, and the five straight lines have different directions with respect to the palm center 23. According to the straight lines' angles and directions with respect to the palm center 23, each straight line corresponding to which finger can be determined. According to the solution above, according to the determined finger relative distribution, a missing finger and a corresponding gesture can further be determined, and during modeling, the missing finger can be omitted to improve the modeling efficiency.

In an optional example, step S25b may be performed by a processor by invoking a corresponding instruction stored in a memory, and may also be performed by a distribution determining unit run by the processor.

Step S25b According to one or more embodiments of the present disclosure may include the following steps:

S25b1, separately determining the direction of at least one finger root position with respect to the palm center 23 position;

S25b2, determining an average direction of the directions of the at least one finger root position with respect to the palm center 23 position;

S25b3, separately comparing the direction of the at least one finger root position with respect to the palm center 23 position with the average direction;

S25b4, removing the finger root position corresponding to a direction having a deviation greater than a preset threshold from the average direction; determining the finger root deviating from the average direction by a deviation exceeding a certain preset threshold as a wrist which is mistaken as the finger, and removing it from the finger set; and S25b5, determining the relative distribution of each of the fingers according to the direction of each of remaining finger root positions with respect to the palm center 23 position.

That is, according to the direction of each of the remaining finger root positions with respect to the palm center 23 position, a sequence of the fingers is determined; in the remaining fingers, according to the directions of the finger roots with respect to the palm center 23, the thumb, index finger, middle finger, ring finger, and little finger are marked in order. The solution above relates to determining the relative distribution of the fingers according to the directions thereof with respect to the palm center, avoids analysis for the shapes of the finger region profiles, and reduces shape judgment operations; this solution has high accuracy and processing efficiency. Relative distribution information determined thereby can provide basis for gesture judgment.

For the condition that only the depth information of the palm center 23 and the depth information of the palm region profile 24 are required to be determined, step S3 above may include the following steps:

S31a, the depth information of the palm centers 23 is determined according to the photographing parameter of the binocular photographing system and the positions of the palm centers 23 in the first hand image and the second hand image.

As stated above, since each of the two hand images only has one palm center 23, they can be directly corresponded; similarly, the palm region profiles 24 can also be directly corresponded. After the corresponding object points are determined, depth information of the object points can be determined according to the photographing parameter.

In an optional example, step S31a may be performed by a processor by invoking a corresponding instruction stored in a memory, and may also be performed by a palm center depth determining unit run by the processor.

S32a, edge points of the palm region profile 24 are projected to the depth where the palm center 23 is located to obtain the depth information of the palm region profile 24.

Under the premise that the depth information of the palm center 23 is determined, a plane can thereby be determined based on the depth; then all of the edge points of the palm region profile 24 are projected onto the depth plane, i.e., the palm region profiles 24 in the two hand images are both projected onto the plane; the plane therefore has two palm region profile 24; and then each pair of the closest points in the two palm region profiles 24 are matched, so as to implement matching of all edge points in the region profiles; then the depth information of the object points can be determined according to the photographing parameter. In the embodiment above, the depth of the object point, i.e., the palm center, is first determined; then all of the points on the edges of the palm region profiles in the two hand images are projected to the plane established based on the palm center depth; the projection depth is used as the depth of the palm region profile to avoid matching one-by-one for the points in the region profiles, thereby improving the processing efficiency.

In an optional example, step S32a may be performed by a processor by invoking a corresponding instruction stored in a memory, and may also be performed by a palm region depth determining unit run by the processor.

For the condition that the depth information of the fingertip 21 and the depth information of the finger region profile 22 are required to be determined, step S3 above may include the following steps:

S31b, a relative position vector is separately determined between the at least one fingertip 21 position and the palm center 23 position in the first hand image and the second hand image.

In an optional example, step S31b may be performed by a processor by invoking a corresponding instruction stored in a memory, and may also be performed by a relative position determining unit run by the processor.

S32b, at least one pair of fingertips 21 in the two images and each pair of finger region profiles 22 in the two images is determined according to a length of a difference between the relative position vectors in the first hand image and the second hand image. For example, if considering a pair of fingertip 21 positions with the minimum length of the relative position vector difference in the first hand image and the second hand image (i.e., a pair of fingertips 21 with the minimum length of the vector difference with respect to the palm center 23) as the same fingertip 21, the finger region profiles 22 corresponding to the matched fingertip 21 positions can further be matched.

In an optional example, step S32b may be performed by a processor by invoking a corresponding instruction stored in a memory, and may also be performed by a finger matching unit run by the processor.

S33b, the depth information of the at least one pair of fingertips 21 is determined according to the photographing parameter of the binocular photographing system and the positions of the at least one pair of fingertips 21 in the first hand image and the second hand image.

In an optional example, step S33b may be performed by a processor by invoking a corresponding instruction stored in a memory, and may also be performed by a fingertip depth determining unit run by the processor.

S34b, edge points of the at least one pair of finger region profiles 22 are projected to the depth where the at least one pair of fingertips 21 are located, to obtain depth information of the at least one pair of finger region profiles 22.

Similar to steps S31a and S32a above, the depth information of the fingertip 21 is first determined, and then based on the depth of the fingertip 21, a projection plane is established; points on the edge of the finger region profile 22 are projected onto the plane to determine the depth information of the edge points. In the embodiments above, fingers in the two images are matched first according to the relative position vectors of the fingertip 21 positions and the palm center 23 positions, to determine corresponding pairs of fingertips 21 and finger region profiles 22; then the depth of each of the fingertips 21, i.e., the object point, is first determined, and points on the edges of the finger region profiles 22 in the two hand images are all projected to a plane established based on the corresponding fingertip 21 depth; the projection depth is used as the depth for the finger region profile 22, to avoid one-by-one matching for the points of the region profile, thereby improving the processing efficiency.

In an optional example, step S34b may be performed by a processor by invoking a corresponding instruction stored in a memory, and may also be performed by a finger depth determining unit run by the processor.

For step S4 above, the previous steps determine the depth information of the key point and the region profile; on this basis, multiple determining sequences for three types of data, i.e., three-dimensional data of each key point, edge three-dimensional point cloud data of each region profile, and hand direction data, are included. Since key points such as the fingertip 21 and the palm center 23 are particularly important in actual applications, to more accurately determine the three-dimensional data of a key point, a determining operation for the three-dimensional data of the key point is executed only based on that the region point cloud data and the hand direction data are determined in this embodiment. In an embodiment, point cloud data of the region profiles covering the key points can be first determined, for example, at least one of the following steps S41 and S42 can be included:

S41, edge three-dimensional point cloud data of a finger region profile 22 is established according to the positions of the edge points on at least one corresponding finger region profile 22 and the depth of the fingertip 21 position in the two hand images; i.e., projecting all of the points on the edge of the finger region profile 22 to the projection plane established based on the fingertip 21 to determine the depth information of the edge points, where a set of the depth information and position information is the three-dimensional point cloud data of the finger region profile 22.

In an optional example, step S41 may be performed by a processor by invoking a corresponding instruction stored in a memory, and may also be performed by a finger point cloud data determining unit run by the processor.

S42, edge three-dimensional point cloud data of a palm region profile 24 is established according to the positions of the edge points on the palm region profile 24 and the depth of the palm center 23 position in the two hand images; i.e., projecting all of the points on the edge of the palm region profile 24 to the projection plane established based on the palm center 23 to determine the depth information of the edge points, where a set of the depth information and position information is the three-dimensional point cloud data of the finger region profile 22.

In an optional example, step S42 may be performed by a processor by invoking a corresponding instruction stored in a memory, and may also be performed by a palm point cloud data determining unit run by the processor.

In another embodiment, the hand direction data can be obtained based on the three-dimensional point cloud data obtained in the step above; the hand direction data may include, for example, data along a finger direction and/or data along a normal direction of the palm; and for example, the following steps may be included:

S42a, main component analysis processing is performed on the edge three-dimensional point cloud data of the finger region profile 22, and a main direction is marked as a finger direction.

As stated above, the main component analysis is a multivariate statistics method, including performing analysis on three-dimensional points to obtain three vectors to respectively correspond to three feature values. The greater the corresponding feature values are, the more significant the distribution of point cloud along this direction is; the main direction is the vector having the maximum corresponding feature value.

In an optional example, step S42a may be performed by a processor by invoking a corresponding instruction stored in a memory, and may also be performed by a finger direction determining unit run by the processor.

S42b, main component analysis processing is performed on edge three-dimensional point cloud data of the palm region profile 24, and a direction of a feature corresponding to the obtained minimum feature value is marked as a normal direction of the palm, i.e., marking the direction of the feature corresponding to the obtained minimum feature value as the normal direction of the palm.

In an optional example, step S42b may be performed by a processor by invoking a corresponding instruction stored in a memory, and may also be performed by a palm normal direction determining unit run by the processor.

Finally, determining the three-dimensional data of the key point based on the hand direction data and the three-dimensional cloud data may include the following steps:

S42a1, using a maximum projection point in the finger direction as a fingertip 21 and determining three-dimensional data thereof;

S42a2, using a minimum projection point in the finger direction as a finger root and determining three-dimensional data thereof;

S42b1, determining a three-dimensional position of an initial palm center 23 according to the photographing parameter of the binocular photographing system, where in this step, the position may be directly determined according to the previously determined depth information of the palm center 23 and the photographing parameter, but the position determined thereby may be considered as inaccurate, and need to be further adjusted based on the initial position; and S42b2, adjusting the three-dimensional position of the initial palm center 23 until the edge points of the three-dimensional palm region profile 24 with the moved palm center 23 position as a center, which are projected onto the first hand image and the second hand image, are within the palm region profile 24, and a sum of the Manhattan distances of the edge points projected onto the first hand image and the second hand image is minimum; determining the moved palm center 23 position as the palm center 23 position; then combining the depth information thereof to constitute the three-dimensional data of the palm center 23.

The means for determining the palm center three-dimensional data includes: first matching the palm centers in the two-dimensional images and combining the photographing parameter to determine an initial palm center position; then projecting the points on the palm region profile on the plane established based on the depth of the initial palm center; according to an effect of the projected points, adjusting the initial palm center position. The three-dimensional data of the palm center determined thereby is more accurate.

In the embodiments above, the region point cloud data is first determined; then the hand direction data is determined based on the region point cloud data; and finally, based on the region point cloud data and hand direction data, the three-dimensional data of the key point is determined; the three-dimensional data of the key point determined thereby is more accurate and stable.

For the gesture information, step S4 may include the following steps: determining whether the number of the determined region profiles in step S2 is less than a preset number; when the number of the region profiles is less than the preset number, determining the missing region profile. If the missing region profile is the finger region profile 22, the relative distribution among the fingers can be determined in step S2, and under the condition that the relative distribution is determined, which finger is missing can be determined.

According to one or more embodiments of the present disclosure, when the number of the detected fingers is less than 5, it can be assumed that the gesture at this moment is a common gesture easy to be made; moreover, on this basis, possible gestures are enumerated to find the most proper one. For example, a common finger curl-up gesture table may be stored in advance:

| The number of curl-up fingers | Common gesture |
| --- | --- |
| 1 | 01111 |
| 2 | 00111, 01011, 01101, 01110, 11001, 11100 |
| 3 | 01001, 01100, 10001, 11000 |
| 4 | 00001, 01000, 10000 |
| 5 | 00000 |

A five bit binary number represents one gesture, and successively represents, from the highest position to the lowest position, states of the thumb, index finger, middle finger, ring finger, and little finger; 1 represents finger extension, and 0 represents finger curl-up, for example, 01000 represents that other fingers are in a curl-up state except the index finger. Hence, the missing finger in the image can be determined, i.e., obtaining the gesture information. In the embodiments above, whether the hand in the image is intact is determined according to the number of the key region profiles; under the condition of determining same to be not intact, the missing region profile is determined according to the relative distribution of the region profile, so as to determine the gesture. This means does not need a large amount of enumerating operations and graphic analyzing operations, and has the high processing efficiency.

Any method for determining hand three-dimensional data provided in the embodiments of the present disclosure can be executed by any appropriate device having data processing capability, including, but not limited to, a terminal device, a server, etc. Alternatively, any method for determining hand three-dimensional data provided in the embodiments of the present disclosure can be executed by a processor, for example, any method for determining hand three-dimensional data mentioned in the embodiments of the present disclosure can be executed by the processor by invoking a corresponding instruction stored in a memory. Details are not described below again.

Persons of ordinary skill in the art may understand that all or some steps for implementing the foregoing method embodiments are achieved by a program by instructing related hardware; the foregoing program can be stored in a computer readable storage medium; when the program is executed, steps including the foregoing method embodiments are executed. Moreover, the foregoing storage medium includes various media capable of storing program codes such as ROM, RAM, a magnetic disk, or an optical disk.

Figure 3:
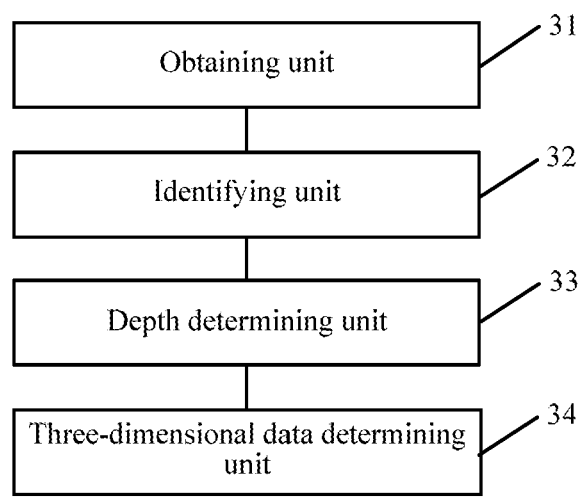
FIG. 3 is a schematic structural diagram of an apparatus for determining hand three-dimensional data according to embodiments of the present disclosure.

Another embodiment of the present disclosure further provides an apparatus for determining hand three-dimensional data. FIG. 3 is a schematic structural diagram of an apparatus for determining hand three-dimensional data according to embodiments of the present disclosure; as shown in FIG. 3, the apparatus includes:

an obtaining unit 31, configured to obtain a first hand image and a second hand image captured by a binocular photographing system;

an identifying unit 32, configured to separately identify, from the first hand image and the second hand image, at least one key point and a region profile covering the at least one key point;

a depth determining unit 33, configured to determine depth information of the at least one key point and depth information of the region profile according to a camera parameter of the binocular camera system, the at least one key point and the region profile identified from the first hand image, and the at least one key point and the region profile identified from the second hand image; and a three-dimensional data determining unit 34, configured to determine hand three-dimensional data according to the at least one key point and the depth information of the at least one key point together with the region profile and the depth information of the region profile.

In the apparatus for determining hand three-dimensional data provided by the embodiments of the present disclosure, a key point and a region profile are identified from a first hand image and a second hand image captured by a binocular photographing system; then depth of the key point and depth of the region profile can be determined according to a photographing parameter of the binocular photographing system, the at least one key point and the region profile identified from the first hand image, and the at least one key point and the region profile identified from the second hand image; furthermore, hand three-dimensional data is determined according to the key point and the depth of the key point together with the region profile and the depth of the region profile. According to the technical solution provided by the present disclosure, regarding contents such as object points and region profiles that can be identified in a two-dimensional image, the depth thereof can all be determined by mutual matching, and three-dimensional data thereof can further be determined. Hence, determining the hand three-dimensional information based on a single frame of a two-dimensional image can be implemented; moreover, the determined hand three-dimensional data is more accurate and richer; furthermore, the technical solution for determining the hand three-dimensional data of the embodiments of the present disclosure has high efficiency and accuracy.

According to one or more embodiments of the present disclosure, the key point, for example, may include, but not limited to, any one or more of: a fingertip, a finger joint point, or a palm center.

According to one or more embodiments of the present disclosure, the region profile covering the at least one key point, for example, may include, but not limited to, any one or more of: a finger region profile covering a fingertip and/or a finger joint point, or a palm region profile covering a palm center.

According to one or more embodiments of the present disclosure, the hand three-dimensional data, for example, may include, but not limited to, any one or more of: three-dimensional data of the key point, edge three-dimensional point cloud data of the region profile, hand direction data, or gesture information.

According to one or more embodiments of the present disclosure, the identifying unit may include:

a palm center identifying unit, configured to separately identify, in the first hand image and the second hand image, a palm center; and a palm center identifying unit, configured to separately determine, in the first hand image and the second hand image, a palm region profile covering the palm center according to the position of the identified palm center. In the optional embodiments, the maximum communication region is searched for from the hand images upon binarization processing, so as to determine the palm center 23 and the palm region profile 24 based on the maximum communication region. This solution relates to searching for the maximum communication region by means of line features, and then determining the palm based on the maximum region, and may reduce influences of image colors and gray scales. Therefore, processing efficiency can be improved.

According to one or more embodiments of the present disclosure, the identifying unit may include:

a palm center identifying unit, configured to identify, in each of the first hand image and the second hand image, a palm center;

a fingertip identifying unit, configured to determine, in each of the first hand image and the second hand image, at least a fingertip and/or finger joint point position according to a position of the identified palm center; and a finger identifying unit, configured to determine one or more finger region profiles covering the at least one fingertip and/or at least one finger joint point according to the fingertip position and/or the finger joint point position in each of the first hand image and the second hand image. In the optional embodiments, the palm center is determined in the hand image upon binarization processing, so as to determine the point in the points on the edge of the maximum communication region farthest away from the palm center; then the region profiles of the suspected fingers are searched for based on the starting point; non-finger region profiles are further excluded according to the profile shapes in the found suspected finger region profiles to screen the finger region profiles. Hence, an influence of a wrist on the identification process can be excluded, and after finding the finger region profiles, the corresponding starting points are determined as the fingertips. Hence, accuracy and processing efficiency can be improved.

According to one or more embodiments of the present disclosure, the hand three-dimensional determining apparatus may further include:

a fingertip correcting unit, configured to separately correct the fingertip position and determine a finger root position according to at least one finger region profile in the first hand image and the second hand image; and a distribution determining unit, configured to determine a relative distribution of the at least one finger region profile according to the corrected fingertip position and the finger root position. According to the solution above, according to the determined finger relative distribution, a missing finger and a corresponding gesture can further be determined, and during modeling, the missing finger can be omitted to improve the modeling efficiency.

According to one or more embodiments of the present disclosure, the fingertip correcting unit may include:

a finger direction determining unit, configured to separately perform main component analysis processing on edge points on the at least one finger region profile, and use an obtained main direction as a finger direction;

a fingertip determining unit, configured to separately determine a maximum projection point in the at least one finger direction as a corrected fingertip position; and a finger root determining unit, configured to separately determine a minimum projection point in the at least one finger direction as a finger root position.

According to one or more embodiments of the present disclosure, the distribution determining unit may include:

a finger root relative direction determining unit, configured to separately determine a direction of the at least one finger root position with respect to the palm center position;

an average direction determining unit, configured to determine an average direction of the direction of the at least one finger root position with respect to the palm center position;

a direction comparing unit, configured to separately compare the direction of the at least one finger root position with respect to the palm center position with the average direction;

a removing unit, configured to remove the finger root positions corresponding to directions having a deviation greater than a preset threshold from the average direction; and a distribution identifying unit, configured to determine the relative distribution of fingers according to the direction of the remaining at least one finger root position with respect to the palm center position.

The solution above relates to determining the relative distribution of the fingers according to the directions thereof with respect to the palm center, avoids analysis for the shapes of the finger region profiles, and reduces shape judgment operations; this solution has high accuracy and processing efficiency. Relative distribution information determined thereby can provide basis for gesture judgment.

According to one or more embodiments of the present disclosure, the palm center identifying unit may include:

a communication region determining unit, configured to separately determine, in the first hand image and the second hand image upon binarization processing, a maximum communication region profile; and a palm center position determining unit, configured to separately determine the position of the palm center according to the maximum communication region profile in the first hand image and the second hand image.

According to one or more embodiments of the present disclosure, the palm identifying unit may include:

a palm radius determining unit, configured to separately determine a palm radius according to a distance from the position of the palm center to each of edges of two maximum communication regions; and a palm region profile determining unit, configured to separately determine the palm region profile according to the palm radius.

According to one or more embodiments of the present disclosure, the palm center identifying unit may include:

a communication region determining unit, configured to separately determine, in the first hand image and the second hand image upon binarization processing, a maximum communication region; and a palm center position determining unit, configured to separately determine the position of the palm center according to the maximum communication region in the first hand image and the second hand image.

Accordingly, the fingertip identifying unit may include:

a far point determining unit, configured to determine a point, in the maximum communication region, farthest from the palm center position;

a suspected region determining unit, configured to determine a suspected finger region profile in the maximum communication region based on the point farthest from the palm center position; and a fingertip determining unit, configured to determine a fingertip from the at least one point farthest from the palm center position and obtain a position thereof according to the shape of the at least one suspected finger region profile; and the finger identifying unit includes:

a finger determining unit, configured to determine the finger region profile from the at least one suspected finger region profile according to the shape of the at least one suspected finger region profile.

According to one or more embodiments of the present disclosure, the depth determining unit may include:

a palm center depth determining unit, configured to determine the depth information of the palm centers according to the photographing parameter of the binocular photographing system and the positions of the palm centers in the first hand image and the second hand image; and a palm region depth determining unit, configured to project edge points of the palm region profile to the depth where each of the palm center is located to obtain the depth information of the palm region profile.

In the embodiment above, the depth of the object point, i.e., the palm center, is first determined; then all of the points on the edges of the palm region profiles in the two hand images are projected to the plane established based on the palm center depth; the projection depth is used as the depth of the palm region profile to avoid matching one-by-one for the points in the region profiles, thereby improving the processing efficiency.

According to one or more embodiments of the present disclosure, the depth determining unit may include:

a relative position determining unit, configured to separately determine a relative position vector between the at least one fingertip position and the palm center position in the first hand image and the second hand image;

a finger matching unit, configured to determine at least one pair of fingertips in the two images and at least one corresponding pair of finger region profiles in the two images according to a length of a difference between the relative position vectors in the first hand image and the second hand image;

a fingertip depth determining unit, configured to determine the depth information of the at least one pair of fingertips according to the photographing parameter of the binocular photographing system and the positions of the at least one pair of fingertips in the first hand image and the second hand image; and a finger depth determining unit, configured to project edge points of the at least one pair of finger region profiles to the depth where the corresponding pair of fingertips are located, to obtain depth information of the at least one pair of finger region profiles. In the embodiments above, fingers in the two images are matched first according to the relative position vectors of the fingertip positions and the palm center positions, to determine at least one corresponding pair of fingertips and finger region profiles; then the depth of the fingertip, i.e., the object point, is first determined, and points on the edges of the finger region profiles in the two hand images are all projected to a plane established based on the corresponding fingertip depth; the projection depth is used as the depth for the finger region profile, to avoid one-by-one matching for the points of the region profile, thereby improving the processing efficiency.

According to one or more embodiments of the present disclosure, the three-dimensional data determining unit may include:

a finger point cloud data determining unit, configured to establish edge three-dimensional point cloud data of the finger region profile according to the positions of the edge points on the finger region profile and the depth of the fingertip position in the two hand images; and/or a palm point cloud data determining unit, configured to establish edge three-dimensional point cloud data of the palm region profile according to the positions of the edge points on the palm region profile and the depth of the palm center position in the two hand images.

According to one or more embodiments of the present disclosure, the three-dimensional data determining unit may include:

a finger direction determining unit, configured to perform main component analysis processing on the edge three-dimensional point cloud data of the finger region profile, and mark a main direction as a finger direction; and/or a palm direction determining unit, configured to perform main component analysis processing on the edge three-dimensional point cloud data of the palm region profile, and mark a feature direction corresponding to a minimum feature value as a palm direction.

According to one or more embodiments of the present disclosure, the three-dimensional data determining unit may include:

a fingertip three-dimensional data determining unit, configured to use a maximum projection point in the finger direction as a fingertip and determine three-dimensional data thereof; and/or a palm center three-dimensional position determining unit, configured to determine an initial palm center three-dimensional position according to the photographing parameter of the binocular photographing system; and a palm center three-dimensional data determining unit, configured to adjust the initial palm center three-dimensional position to obtain an adjusted palm center three-dimensional position and determine three-dimensional data thereof. The means for determining the palm center three-dimensional data includes: first matching the palm centers in the two-dimensional images and combining the photographing parameter to determine an initial palm center position; then projecting the points on the palm region profile on the plane established based on the depth of the initial palm center; according to an effect of the projected points, adjusting the initial palm center position. The three-dimensional data of the palm center determined thereby is more accurate.

In the embodiments above, the region point cloud data is first determined; then the hand direction data is determined based on the region point cloud data; and finally, based on the region point cloud data and hand direction data, the three-dimensional data of the key point is determined; the three-dimensional data of the key point determined thereby is more accurate and stable.

The embodiments of the present disclosure further provide an electronic device which, for example, may be a mobile terminal, a Personal Computer (PC), a tablet computer, a server, and the like. The electronic device includes: at least one processor; and a memory communicationally connected to the at least one processor; where the memory stores instructions executable by the at least one processor; and the instructions are executed by the at least one processor, so that the at least one processor executes operations corresponding to the method for determining hand three-dimensional data according to any one of the embodiments of the present disclosure.

Figure 4:
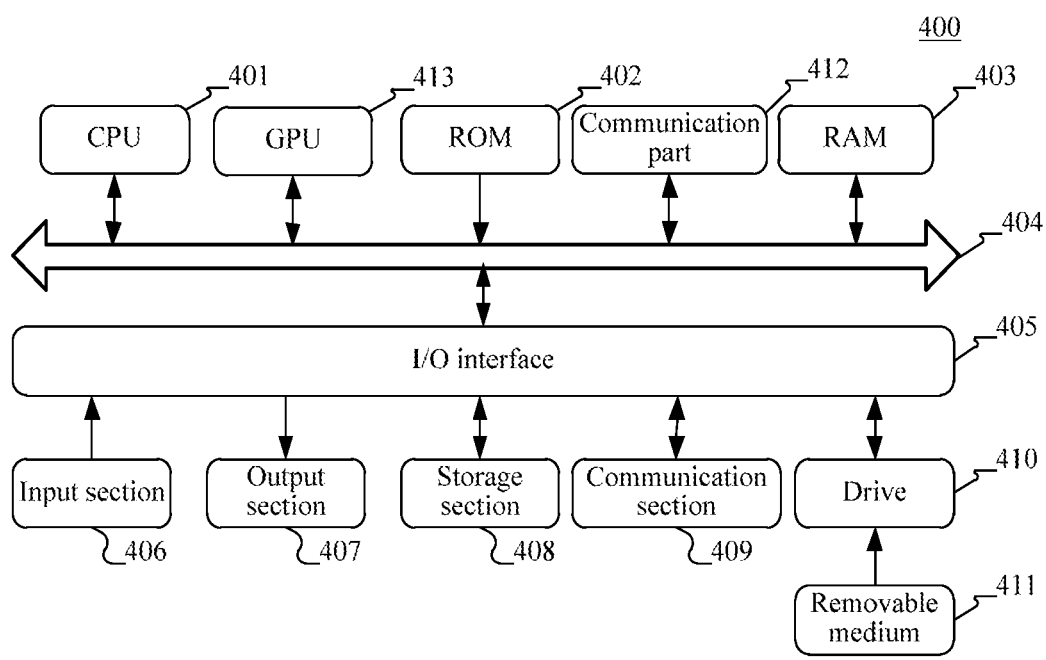
FIG. 4 is a schematic structural diagram of an electronic device according to the embodiments of the present disclosure.

FIG. 4 is a schematic structural diagram of an electronic device according to the embodiments of the present disclosure. Referring to FIG. 4 below, a schematic structural diagram of an electronic device 400, which may be a terminal device or a server, suitable for implementing an embodiment of the present disclosure is shown. As shown in FIG. 4, the computer system 400 includes one or more processors, a communication part, and the like. The one or more processors are, for example, one or more Central Processing Units (CPUs) 401 and/or one or more Graphic Processing Units (GPUs) 413, and may execute appropriate actions and processing according to executable instructions stored in a Read-Only Memory (ROM) 402 or executable instructions loaded from a storage section 408 to a Random Access Memory (RAM) 403. The communication part 412 may include, but is not limited to, a network card. The network card may include, but is not limited to, an Infiniband (IB) network card.

The processor may be communicated with the ROM 402 and/or RAM 403 to execute the executable instructions and is connected to a communication part 412 by means of a bus 404 and communicated with other target devices by means of the communication part 412, so as to implement the operations corresponding to any method provided by the embodiments of the present disclosure. For example, obtaining a first hand image and a second hand image captured by a binocular photographing system; identifying, from each of the first hand image and the second hand image, at least one key point and a region profile covering the at least one key point; determining depth information of the at least one key point and depth information of the region profile according to a photographing parameter of the binocular photographing system, the at least one key point and the region profile identified from the first hand image, and the at least one key point and the region profile identified from the second hand image; and determining hand three-dimensional data according to the at least one key point and the depth information of the at least one together with the region profile and the depth information of the region profile.

In addition, the RAM 403 further stores various programs and data required for operations of the apparatus. The CPU 401, the ROM 402, and the RAM 403 are connected to each other via the bus 404. In the case that the RAM 403 exists, the ROM 402 is an optional module. The RAM 403 stores executable instructions, or writes the executable instructions into the ROM 402 during running, where the executable instructions cause the CPU 401 to execute corresponding operations of the foregoing communication method. An I/O interface 405 is also connected to the bus 404. The communication part 412 can be integrated, or is configured to have multiple sub-modules (for example, multiple IB network cards) connected to the bus 404.

The following components are connected to the I/O interface 405: an input section 406 including a keyboard, a mouse and the like; an output section 407 including a Cathode-Ray Tube (CRT), a Liquid Crystal Display (LCD), a speaker and the like; the storage section 408 including a hard disk and the like; and a communication section 409 of a network interface card including an LAN card, a modem and the like. The communication section 409 performs communication processing via a network such as the Internet. A drive 410 is also connected to the I/O interface 405 according to requirements. A removable medium 411 such as a magnetic disk, an optical disk, a magneto-optical disk, a semiconductor memory or the like is mounted on the drive 410 according to requirements, so that a computer program read from the removable medium 408 is installed on the storage section 408 according to requirements.

It should be noted that the architecture illustrated in FIG. 4 is merely an optional implementation mode. During specific practice, the number and types of the components in FIG. 4 may be selected, decreased, increased, or replaced according to actual requirements. Different functional components may be separated or integrated or the like. For example, the GPU 413 and the CPU 401 may be separated, or the GPU 413 may be integrated on the CPU 401, and the communication portion may be separated from or integrated on the CPU 401 or the GPU 413 or the like. These alternative implementations all fall within the scope of protection of the present disclosure.

Particularly, a process described above with reference to a flowchart according to the embodiments of the present disclosure is implemented as a computer software program. For example, the embodiments of the disclosure includes a computer program product, including a computer program physically included on a computer-readable medium, and the computer program includes a program code for executing the method shown in the execution flow chart; the program code may include corresponding instructions for executing method steps provided by the embodiments of the present disclosure, for example, obtaining a first hand image and a second hand image captured by a binocular photographing system; identifying, from each of the first hand image and the second hand image, at least one key point and a region profile covering the at least one key point; determining depth information of the at least one key point and depth information of the region profile according to a photographing parameter of the binocular photographing system, the key at least one point and the region profile identified from the first hand image, and the at least one key point and the region profile identified from the second hand image; and determining hand three-dimensional data according to the at least one key point and the depth information of the at least one key point together with the region profile and the depth information of the region profile. In such embodiments, the computer program is downloaded and installed from the network through the communication section 409, and/or is installed from the removable medium 411. When the computer program is executed by the CPU 401, the functions defined in the method according to the present disclosure are executed.

In addition, a computer-readable storage medium is further provided by the embodiments of the present disclosure, which is configured to store computer instructions thereon, where when the instructions are executed, operations in steps of the three-dimensional data determining method according to any one of the embodiments of the present disclosure are implemented.

In addition, the embodiments of the present disclosure further provide a computer program, including a computer-readable code, where when the computer-readable code runs in a device, a processor in the device executes instructions for implementing the steps of the three-dimensional data determining method according to any one of the embodiments of the present disclosure.

The methods, apparatuses, and devices in the present disclosure are implemented in many manners. For example, the methods, apparatuses, and devices in the present disclosure are implemented with software, hardware, firmware, or any combination of software, hardware, and firmware. The foregoing sequence of the steps of the method is merely for description, and unless otherwise stated particularly, the steps of the method in the present disclosure are not limited to the described sequence. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for determining hand three-dimensional data, comprising:
    obtaining a first hand image and a second hand image captured by a binocular photographing system;
    identifying, from each of the first hand image and the second hand image, at least one key point and a region profile covering the at least one key point;
    determining depth information of the at least one key point and depth information of the region profile according to a photographing parameter of the binocular photographing system, the at least one key point and the region profile identified from the first hand image and the at least one key point and the region profile identified from the second hand image; and
    determining the hand three-dimensional data according to the at least one key point and the depth information of the at least one key point together with the region profile and the depth information of the region profile,
    wherein the identifying, from each of the first hand image and the second hand image, the at least one key point and the region profile covering the at least one key point comprises:
    identifying, in each of the first hand image and the second hand image, a palm center; and
    determining, in each of the first hand image and the second hand image, a palm region profile covering the palm center according to a position of the identified palm center.

2. The method according to claim 1, wherein the at least one key point further comprises any one or more of: a fingertip, or a finger joint point.

3. The method according to claim 1, wherein the region profile covering the at least one key point further comprises a finger region profile covering at least one of a fingertip or a finger joint point.

4. The method according to claim 1, wherein the hand three-dimensional data comprises any one or more of: three-dimensional data of the at least one key point, edge three-dimensional point cloud data of the region profile, hand direction data, or gesture information.

5. The method according to claim 1, wherein the identifying, from each of the first hand image and the second hand image, the key point and the region profile covering the at least one key point further comprises:
    determining, in each of the first hand image and the second hand image, at least one fingertip position and/or at least one finger joint point position according to a position of the identified palm center; and
    determining one or more finger region profiles covering the at least one fingertip and/or the at least one finger joint point according to the fingertip position and/or the finger joint point position in each of the first hand image and the second hand image.

6. The method according to claim 1, wherein the identifying, from each of the first hand image and the second hand image, the key point and the region profile covering the at least one key point further comprises:
    identifying, in each of the first hand image and the second hand image, a palm center;
    determining, in each of the first hand image and the second hand image, at least one fingertip position and/or at least one finger joint point position according to a position of the identified palm center; and
    determining one or more finger region profiles covering the at least one fingertip and/or the at least one finger joint point according to the fingertip position and/or the finger joint point position in each of the first hand image and the second hand image.

7. The method according to claim 6, wherein the correcting each fingertip position and determining each finger root position according to the respective finger region profile in each of the first hand image and the second hand image comprises:
    in each of the first hand image and the second hand image, performing main component analysis processing on edge points on the finger region profile, and using an obtained main direction as a finger direction;
    determining a maximum projection point in the finger direction as the corrected fingertip position; and
    determining a minimum projection point in the finger direction as the finger root position.

8. The method according to claim 6, wherein the determining the relative distribution of each finger region profile according to the corrected fingertip position and the finger root position comprises:
   determining a direction of each finger root position with respect to the palm center position;
   determining an average direction of directions of the finger root positions with respect to the palm center position;
   comparing, with the average direction, each of the directions of the finger root positions with respect to the palm center position;
   removing the finger root position corresponding to a direction having a deviation greater than a preset threshold from the average direction; and
   determining the relative distribution of fingers according to the directions of remaining finger root positions with respect to the palm center position.

9. The method according to claim 1, wherein
   the identifying, in each of the first hand image and the second hand image, the palm center comprises:
   determining, in each of the first hand image and the second hand image subject to binarization processing, a maximum communication region profile; and
   determining the position of the palm center according to the maximum communication region profile in each of the first hand image and the second hand image.

10. The method according to claim 9, wherein the determining, in each of the first hand image and the second hand image, the palm region profile covering the palm center according to the position of the identified palm center comprises:
    separately determining a palm radius according to a distance from the position of the palm center to each of edges of two maximum communication regions; and
    separately determining the palm region profile according to the palm radius.

11. The method according to claim 5, wherein the identifying, in each of the first hand image and the second hand image, the palm center comprises: determining, in each of the first hand image and the second hand image subjected to binarization processing, a maximum communication region; and determining the position of the palm center according to the maximum communication region in each of the first hand image and the second hand image;
    the determining, in each of the first hand image and the second hand image, at least one of the at least one fingertip position or the at least one finger joint point position according to the position of the identified palm center comprises: determining a point, in the maximum communication region, farthest from the palm center position; determining a suspected finger region profile in the maximum communication region based on the point farthest from the palm center position; and determining a fingertip from the point farthest from the palm center position and obtaining a position of the determined fingertip according to the shape of the suspected finger region profile; and
    the determining the one or more finger region profiles according to the at least one fingertip position in each of the first hand image and the second hand image comprises:
    determining the finger region profile from the suspected finger region profile according to the shape of the suspected finger region profile.

12. The method according to claim 1, wherein the determining the depth information of the at least one key point and the depth information of the region profile according to the photographing parameter of the binocular photographing system, the at least one key point and the region profile identified from the first hand image, and the corresponding key point and the corresponding region profile identified from the second hand image comprises:
    determining the depth information of palm centers according to the photographing parameter of the binocular photographing system and the positions of the palm centers in the first hand image and the second hand image; and
    projecting edge points of a palm region profile to the depth where the palm center is located to obtain the depth information of the palm region profile.

13. The method according to claim 1, wherein the determining the depth information of the at least one key point and the depth information of the region profile according to the photographing parameter of the binocular photographing system, the at least one key point and the region profile identified from the first hand image, and the at least one key point and the region profile identified from the second hand image comprises:
    determining a relative position vector between at least one fingertip position and a palm center position in each of the first hand image and the second hand image;
    determining at least one pair of fingertips in the two images and at least one corresponding pair of finger region profiles in the two images according to a length of a difference between the relative position vectors in the first hand image and the second hand image;
    determining the depth information of the at least one pair of fingertips according to the photographing parameter of the binocular photographing system and the positions of the at least one pair of fingertips in the first hand image and the second hand image; and
    projecting edge points of the at least one pair of finger region profiles to the depth where the at least one pair of fingertips are located, to obtain depth information of the at least one pair of finger region profiles.

14. The method according to claim 4, wherein the determining the edge three-dimensional point cloud data of the region profile comprises at least one of:
    establishing edge three-dimensional point cloud data of a finger region profile according to the positions of the edge points on the finger region profile and the depth of a fingertip position in the two hand images; or
    establishing edge three-dimensional point cloud data of a palm region profile according to the positions of the edge points on the palm region profile and the depth of a palm center position in the two hand images.

15. The method of claim 14, wherein the determining the hand direction data comprises at lease one of:
    performing main component analysis processing on the edge three-dimensional point cloud data of the finger region profile, and marking a main direction as a finger direction; or
    performing main component analysis processing on the edge three-dimensional point cloud data of the palm region profile, and marking a feature direction corresponding to a minimum feature value as a normal direction of a palm.

16. The method according to claim 15, wherein the determining the three-dimensional data of the at least one key point comprises at least one of:
    using a maximum projection point in the finger direction as a fingertip and determining three-dimensional data of the fingertip; or determining an initial palm center three-dimensional position according to the photographing parameter of the binocular photographing system; and adjusting the initial palm center three-dimensional position to obtain an adjusted palm center three-dimensional position and determining three-dimensional data of the adjusted palm center three-dimensional position.

17. An apparatus for determining hand three-dimensional data, comprising:
- a memory storing processor-executable instructions; and
- a processor arranged to execute the stored processor-executable instructions to perform steps of:
  - obtaining a first hand image and a second hand image captured by a binocular photographing system;
  - identifying, from each of the first hand image and the second hand image, at least one key point and a region profile covering the at least one key point;
  - determining depth information of the at least one key point and depth information of the region profile according to a photographing parameter of the binocular photographing system, the at least one key point and the region profile identified from the first hand image, and the at least one key point and the region profile identified from the second hand image; and
  - determining the hand three-dimensional data according to the at least one key point and the depth information of the at least one key point together with the region profile and the depth information of the region profile,
  - wherein the identifying, from each of the first hand image and the second hand image, the at least one key point and the region profile covering the at least one key point comprises:
  - identifying, in each of the first hand image and the second hand image, a palm center; and
  - determining, in each of the first hand image and the second hand image, a palm region profile covering the palm center according to a position of the identified palm center.

18. The apparatus according to claim 17, wherein the at least one key point further comprises any one or more of: a fingertip, or a finger joint point.

19. A non-transitory computer-readable storage medium having stored thereon computer instructions that, when executed by a processor, cause the processor to perform a method for determining hand three-dimensional data, the method comprising:
- obtaining a first hand image and a second hand image captured by a binocular photographing system;
- identifying, from each of the first hand image and the second hand image, at least one key point and a region profile covering the at least one key point;
- determining depth information of the at least one key point and depth information of the region profile according to a photographing parameter of the binocular photographing system, the at least one key point and the region profile identified from the first hand image and the at least one key point and the region profile identified from the second hand image; and
- determining the hand three-dimensional data according to the at least one key point and the depth information of the at least one key point together with the region profile and the depth information of the region profile,
- wherein the identifying, from each of the first hand image and the second hand image, the at least one key point and the region profile covering the at least one key point comprises:
- identifying, in each of the first hand image and the second hand image, a palm center; and
- determining, in each of the first hand image and the second hand image, a palm region profile covering the palm center according to a position of the identified palm center.

20. The non-transitory computer-readable storage medium according to claim 19, wherein the at least one key point further comprises any one or more of: a fingertip, or a finger joint point.

* * * * *